(12) United States Patent
Ninamohina et al.

(10) Patent No.: US 12,179,702 B2
(45) Date of Patent: Dec. 31, 2024

(54) CONVERTIBLE COVERING SHELF STRUCTURE

(71) Applicants: Hyundai Motor Company, Seoul (KR); Kia Corporation, Seoul (KR)

(72) Inventors: Abilash Ninamohina, Telangana (IN); Pavan Kumar Akula, Andhra Pradesh (IN); Ki Duck Bae, Seoul (KR); Surendra Reddy Duddukunta, YSR (Cuddapah) District (IN)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 204 days.

(21) Appl. No.: 17/948,505

(22) Filed: Sep. 20, 2022

(65) Prior Publication Data

US 2024/0034215 A1 Feb. 1, 2024

(30) Foreign Application Priority Data

Jul. 27, 2022 (IN) .............................. 202211042974

(51) Int. Cl.
    *B60R 5/04* (2006.01)
(52) U.S. Cl.
    CPC .................................. *B60R 5/045* (2013.01)
(58) Field of Classification Search
    CPC ...................................................... B60R 5/045
    USPC ........................................ 224/539, 542, 543
    See application file for complete search history.

(56) References Cited

U.S. PATENT DOCUMENTS

| 2,619,395 | A | * | 11/1952 | Kent | ...................... | B60N 3/004 |
|---|---|---|---|---|---|---|
| | | | | | | 297/146 |
| 2,878,945 | A | * | 3/1959 | Speir | ...................... | B60N 3/004 |
| | | | | | | 224/539 |
| 3,291,520 | A | * | 12/1966 | Smith | ...................... | B60J 5/103 |
| | | | | | | 296/37.16 |
| 4,351,555 | A | * | 9/1982 | Hashimoto | ............. | B60R 5/044 |
| | | | | | | 296/37.16 |
| 5,669,537 | A | * | 9/1997 | Saleem | ...................... | B60R 7/02 |
| | | | | | | 224/42.32 |
| 5,931,527 | A | * | 8/1999 | D'Onofrio | ............. | B60N 3/004 |
| | | | | | | 297/188.05 |
| 5,967,054 | A | * | 10/1999 | Rosenfeld | ............. | B60N 3/002 |
| | | | | | | 5/118 |

(Continued)

FOREIGN PATENT DOCUMENTS

| DE | 102006009771 B4 | * | 4/2013 | ............. | B60R 5/045 |
|---|---|---|---|---|---|
| DE | 19906648 B4 | * | 4/2014 | ............. | B60R 5/045 |

(Continued)

*Primary Examiner* — Justin M Larson
(74) *Attorney, Agent, or Firm* — MORGAN, LEWIS & BOCKIUS LLP

(57) ABSTRACT

A convertible covering shelf structure for dividing a rear portion of a rear seat and a cargo space of a trunk compartment in a vehicle includes a first covering shelf provided behind the rear seat, a second covering shelf which is hingedly connected to a first end portion of the first covering shelf and is folded and horizontally deployed so that its upper surface faces the upper surface of the first covering shelf, and a pair of guide brackets fixed to a rear seat back frame of the vehicle and including a slit into which first and second sides of a second end portion of the first covering shelf is inserted to move the first covering shelf.

13 Claims, 23 Drawing Sheets

(56) References Cited

U.S. PATENT DOCUMENTS

| | | | | |
|---|---|---|---|---|
| 6,050,202 A * | 4/2000 | Thompson | ............... | B60R 5/045 |
| | | | | 296/37.16 |
| 6,113,172 A * | 9/2000 | Chaloult | ................... | B60R 5/04 |
| | | | | 296/37.16 |
| 6,546,598 B1 * | 4/2003 | Nakanou | ................... | B60R 5/04 |
| | | | | 224/281 |
| 6,773,046 B2 * | 8/2004 | Nakamitsu | ............... | B60R 5/045 |
| | | | | 296/37.16 |
| 6,942,269 B2 * | 9/2005 | Mains | ................... | B60N 3/001 |
| | | | | 296/37.16 |
| 7,401,716 B2 * | 7/2008 | Svenson | ................. | B60R 5/045 |
| | | | | 224/42.32 |
| 9,428,113 B2 * | 8/2016 | V | ........................ | B60R 13/0268 |
| 9,862,325 B2 * | 1/2018 | Huebner | ................... | B60R 7/02 |
| 10,144,331 B2 * | 12/2018 | Hansen | .................... | B60N 2/64 |
| 10,300,860 B2 * | 5/2019 | Bathelier | ................ | B60R 5/048 |
| 10,696,234 B2 * | 6/2020 | Choi | ....................... | B60R 5/044 |
| 10,787,128 B2 * | 9/2020 | Ngo | ........................ | B60R 5/044 |
| 11,858,466 B2 * | 1/2024 | Gandolfo | ................ | B60R 7/043 |
| 2006/0180623 A1 * | 8/2006 | Reynolds | ................. | B60R 5/04 |
| | | | | 224/543 |
| 2008/0012374 A1 * | 1/2008 | Hofmann | ................ | B60R 5/045 |
| | | | | 296/37.1 |
| 2019/0308538 A1 * | 10/2019 | Buchanan | .............. | B60N 3/004 |

FOREIGN PATENT DOCUMENTS

| | | | | |
|---|---|---|---|---|
| FR | 2991252 A1 * | 12/2013 | ............ | B60R 5/045 |
| FR | 3017350 A1 * | 8/2015 | ............ | B60R 5/006 |
| JP | 58022735 A * | 2/1983 | | |
| KR | 100779851 B1 * | 11/2007 | | |
| KR | 829088 B1 * | 5/2008 | ............ | B60R 5/003 |

\* cited by examiner

CONVERTIBLE COVERING SHELF STRUCTURE

CROSS-REFERENCE TO RELATED APPLICATION

The present application claims priority to Indian Patent Application No. 202211042974, filed on Jul. 27, 2022, the entire contents of which is incorporated herein for all purposes by this reference.

BACKGROUND OF THE PRESENT DISCLOSURE

Field of the Present Disclosure

The present disclosure relates to a covering shelf structure for use in a vehicle including a tailgate. More particularly, the present disclosure relates to a convertible covering shelf structure capable of changing the position and shape of the covering shelf as necessary.

Description of Related Art

In general, a hatchback type vehicle does not have a separate trunk compartment unlike a notchback type vehicle, and instead utilizes a space between a rear seat and a tailgate as a trunk compartment.

Furthermore, the hatchback type vehicle is provided with a covering shelf for shielding the space of the trunk compartment according to the opening and closing of the tailgate. As shown in FIG. 1, a covering shelf 1 has a structure in which both sides are mounted on a luggage side trim 3 of the vehicle to be fixed and detached in the trunk compartment space behind a rear seat 2.

However, because the existing covering shelf 1 is not of a deformable structure, as shown in FIG. 2, when bulky or more luggage is stored in the trunk compartment space, the covering shelf 1 must be separated and removed. The present task is not easy for users to perform.

Furthermore, as shown in FIG. 3, when the rear seat 2 is changed to be inclined rearward thereof, the operation of the rear seat 2 should not be obstructed by the covering shelf 1, so a sufficient gap GAP must be ensured between the covering shelf 1 and the rear seat 2. This becomes an aesthetically detrimental factor, and there is a problem in that space utilization is reduced.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a convertible covering shelf structure to increase luggage storage space in the trunk and improve usability.

A convertible covering shelf structure for dividing a rear portion of a rear seat and a cargo space of a trunk compartment in a vehicle according to various exemplary embodiments of the present disclosure includes a first covering shelf provided behind the rear seat, a second covering shelf which is hingedly connected to a first end portion of the first covering shelf and is folded and horizontally deployed so that its upper surface faces the upper surface of the first covering shelf, and a pair of guide brackets fixed to a rear seat back frame of the vehicle and including a slit into which first and second sides of a second end portion of the first covering shelf is inserted to move the first covering shelf.

Guide hinge pins may be provided on both sides of the second end portion of the first covering shelf, and the guide hinge pins may be inserted into the slit of the guide brackets for the first covering shelf to move in a longitudinal direction of the guide brackets.

The guide hinge pins may be inserted into the hollow of the guide hinge bush, and the guide hinge bushes are inserted into the slit of the guide brackets.

The upper slit of the guide brackets may be formed to extend in front and rear direction of the vehicle.

An upper guide bracket support member is provided on an upper side of the guide brackets, and a lower guide bracket support member is provided on a lower side of the guide brackets, and the upper guide bracket support member and the lower guide bracket support member may be welded to the rear seat back frame.

The pair of guide brackets is horizontally connected to the vehicle by a covering shelf support wire, and the covering shelf support wire may support the first covering shelf and the second covering shelf from the trunk compartment side after the first covering shelf and the second covering shelf are coupled to the slit of the guide brackets.

A support slot is provided at a side end portion of the first covering shelf, and the support slot may be inserted into a support protrusion protruding from a luggage side trim forming a trunk compartment of the vehicle, so that the first covering shelf is supported on the support protrusion.

A user grippable strap may be provided at a central end portion of the first covering shelf at a hinge portion where the second covering shelf and the first covering shelf are folded.

Open openings including one open side are provided on first and second sides of the first covering shelf of the hinge portion, and connection protrusions are provided on first and second sides of the second covering shelf of the hinge portion, and the connection protrusions may be inserted into the open openings so that the second covering shelf hinges with respect to the first covering shelf and the connection protrusions are separatable from the open side of the open openings.

Closed openings are provided on first and second sides of the first covering shelf of the hinge portion, a connection rod detachable in the longitudinal direction is provided on the second covering shelf of the hinge portion, and the connection rod may be inserted into the closed openings so that the second covering shelf hinges with respect to the first covering shelf and the connection rod is selectively separatable from the closed openings.

A central end portion of the second covering shelf is connected to a tailgate of the vehicle by a cable, and when the tailgate is open, the second covering shelf may operate to hinge with respect to the first covering shelf by pulling an end portion of the second covering shelf through the cable.

A pair of support pipes including a first end portion rotatably fixed to the second covering shelf is provided on a surface of the second covering shelf, and the other end portion of the pair of support pipes may be rotated toward one surface of the second covering shelf.

A locking plate rotating on the surface of the second covering shelf is provided at a center portion of the surface of the second covering shelf, and the locking plate may operate to attach or release the second end portion of the pair of support pipes to the surface of the second covering shelf by rotation thereof.

According to various exemplary embodiments of the present disclosure, by adopting a double convertible covering shelf structure which is provided on the rear seat back frame of the vehicle and is rotatable and detachable, it is possible to increase the luggage storage space in the trunk.

Furthermore, by allowing the covering shelf to rotate according to the opening and closing of the tailgate, a user can easily change the covering shelf, improving usability.

Furthermore, the covering shelf separated by the detachable double covering shelf structure may be used as a table, and the non-separable covering shelf may be used as a separate item holder.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
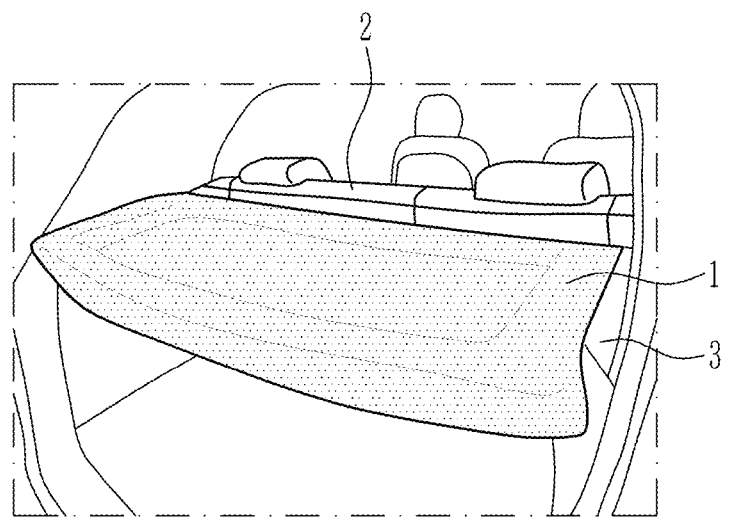
FIG. 1 is a view exemplarily illustrating a state in which a covering shelf is provided in a trunk compartment in a conventional hatchback type vehicle.
Figure 2:
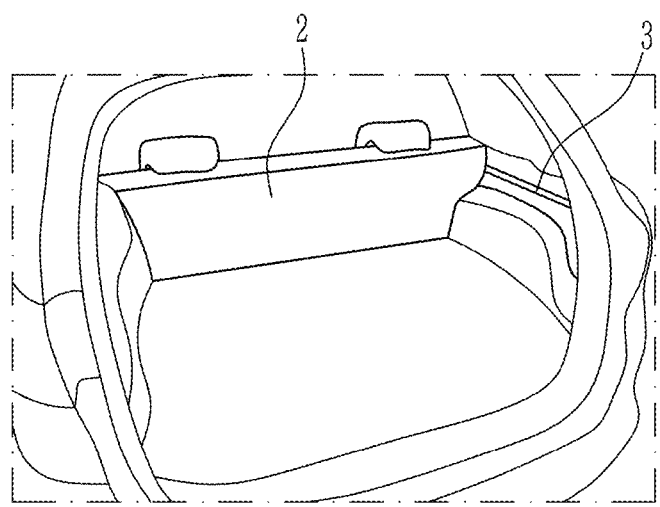
FIG. 2 is a view exemplarily illustrating a state in which luggage is stored in a trunk compartment after a covering shelf is removed in a conventional hatchback type vehicle.
Figure 3:
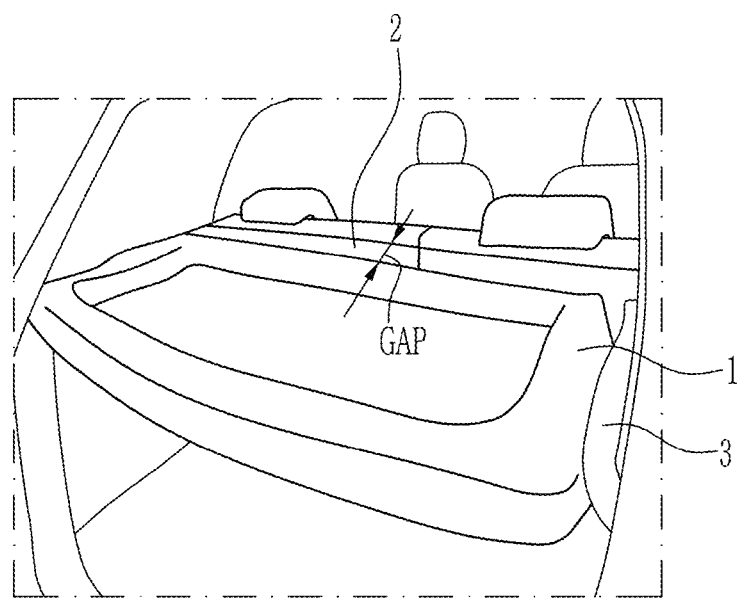
FIG. 3 is a view exemplarily illustrating a gap formed between a covering shelf and a rear seat in a conventional hatchback type vehicle.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

Furthermore, in exemplary embodiments of the present disclosure, since like reference numerals designate like elements having the same configuration, a first exemplary embodiment of the present disclosure is representatively described, and in other exemplary embodiments of the present disclosure, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Furthermore, like structures, elements, or components illustrated in two or more drawings use same reference numerals for showing similar features. It will be understood that when an element such as a layer, film, region, or substrate is referred to as being "on" another element, it may be directly on the other element or intervening elements may also be present.

The exemplary embodiment of the present disclosure shows various exemplary embodiments of the present disclosure in detail. As a result, various modifications of the drawings will be expected. Therefore, the exemplary embodiment of the present disclosure is not limited to a specific aspect of the illustrated region, and for example, includes modifications of an aspect by manufacturing.

Now, a convertible covering shelf structure according to various exemplary embodiments of the present disclosure will be described with reference to appended drawings.

Figure 4:
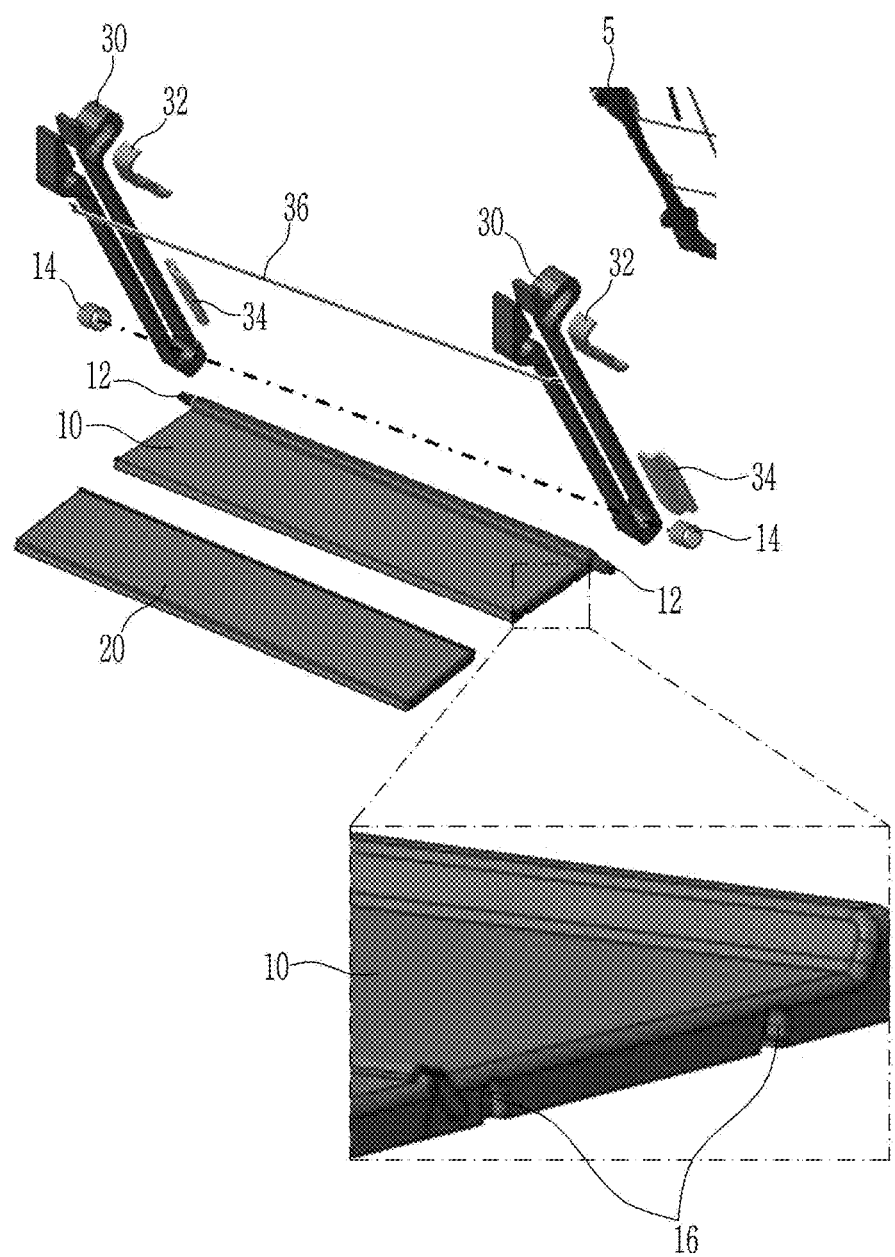
FIG. 4 is an exploded perspective view exemplarily illustrating a convertible covering shelf structure according to various exemplary embodiments of the present disclosure.
Figure 5:
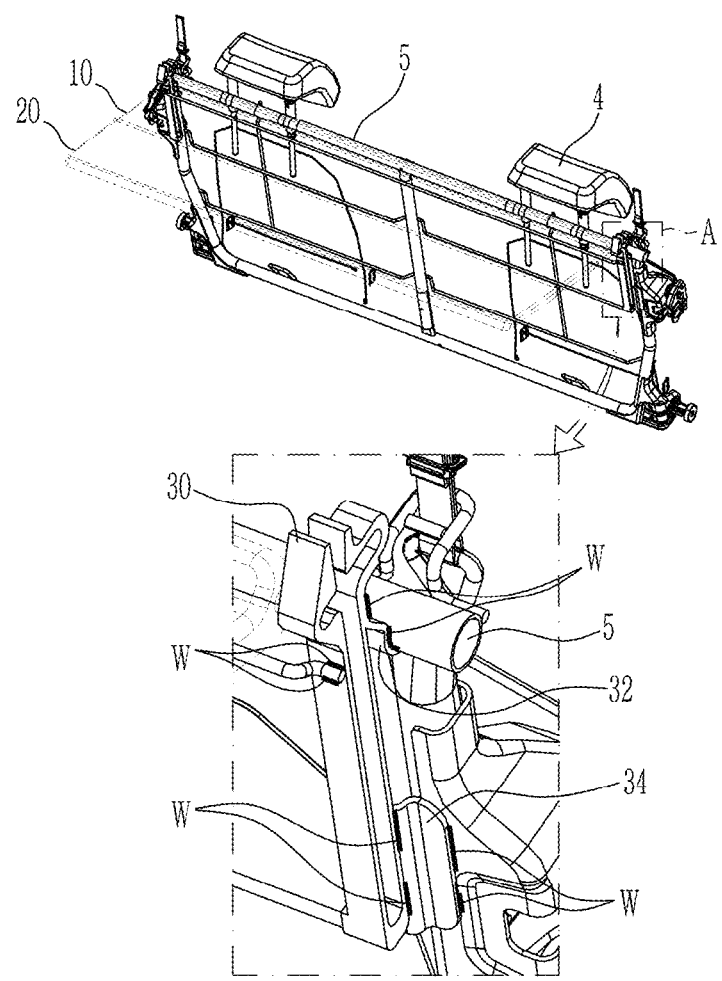
FIG. 5 is a view showing a state in which the convertible covering shelf structure according to various exemplary embodiments of the present disclosure is connected to and provided on the rear seat back frame.
Figure 6:
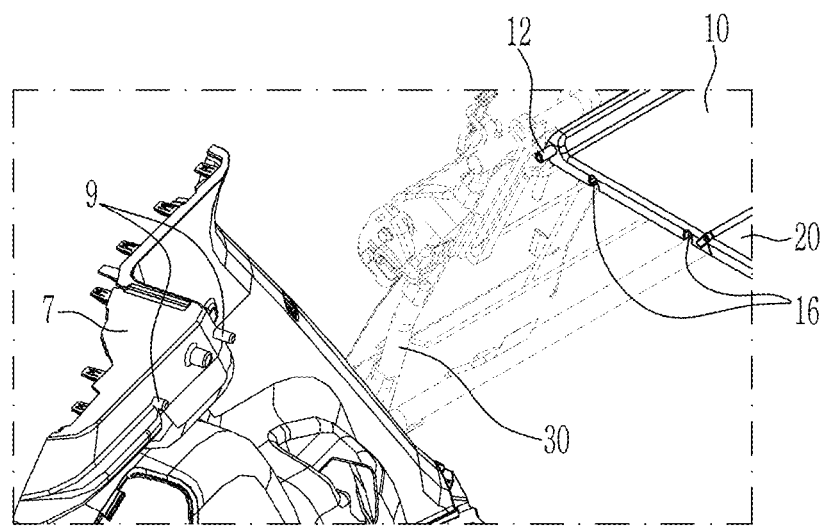
FIG. 6 is a view exemplarily illustrating a coupling relationship between a support slot and a support protrusion of the convertible covering shelf structure according to various exemplary embodiments of the present disclosure.
Figure 7:
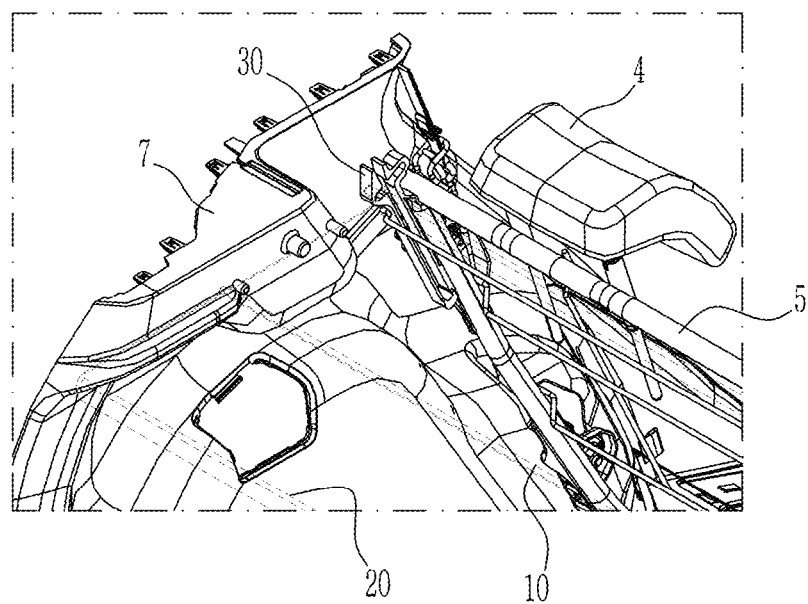
FIG. 7 is a view showing a state in which the convertible covering shelf structure according to various exemplary embodiments of the present disclosure is provided and connected to a luggage side trim.

FIG. 4 is an exploded perspective view exemplarily illustrating a convertible covering shelf structure according to various exemplary embodiments of the present disclosure, FIG. 5 is a view showing a state in which the convertible covering shelf structure according to various exemplary embodiments of the present disclosure is connected to and provided on the rear seat back frame, FIG. 6 is a view exemplarily illustrating a coupling relationship between a support slot and a support protrusion of the convertible covering shelf structure according to various exemplary embodiments of the present disclosure, and FIG. 7 is a view showing a state in which the convertible covering shelf structure according to various exemplary embodiments of the present disclosure is provided and connected to a luggage side trim.

First, referring to FIG. 4, a convertible covering shelf structure according to various exemplary embodiments of the present disclosure is for dividing a rear portion of a rear seat 4 and a cargo space of a trunk compartment of the vehicle, and includes a first covering shelf 10, a second covering shelf 20, and a pair of guide brackets 30.

Here, the covering shelves are hinged to be foldable with each other, and include two covering shelves 10 and 20. The first covering shelf 10 and the second covering shelf 20 are provided in the trunk compartment space behind the rear seat 4, and in the folded state, the first covering shelf 10 is positioned below the second covering shelf 20. That is, the second covering shelf 20 is hingedly connected to one end portion of the first covering shelf 10, and is folded and horizontally deployed so that its upper surface faces the upper surface of the first covering shelf 10.

Guide brackets 30 are provided at both end portions of the first covering shelf 10 and the second covering shelf 20, and are fixed to the rear seat back frame 5 of the vehicle. A slit including an open upper portion is formed in the guide bracket 30, and both sides of the other end portion of the first covering shelf 10 are inserted into the slit so that the first covering shelf 10 and the second covering shelf 20 can move up and down along the guide bracket 30.

Guide hinge pins 12 may be provided on both sides of the other end portion of the first covering shelf 10. The guide hinge pin 12 is inserted into the slit of the guide bracket 30 so that the first covering shelf 10 and the second covering shelf 20 can be moved in the longitudinal direction of the guide bracket 30. Furthermore, a guide hinge bush 14 including a hollow formed thereon may be coupled to the circumference of the guide hinge pin 12, and as the guide hinge bush 14 rotates, the first covering shelf 10 moves through the slit of the guide bracket 30.

Meanwhile, the upper slit of the guide bracket 30 may be formed to extend in a front and a rear of the vehicle, that is, in a direction perpendicular to the longitudinal direction of the guide bracket 30. The guide hinge pin 12 is positioned in the slit on the upper side of the guide bracket 30, so that when the first covering shelf 10 changes in the horizontal direction of the vehicle, the slit can serve to support the guide hinge pin 12.

On the other hand, the upper guide bracket support member 32 may be provided on the upper side of the guide bracket 30, and the lower guide bracket support member 34 may be provided on the lower side of the guide bracket 30. The upper guide bracket support member 32 and the lower guide bracket support member 34 are positioned between the guide bracket 30 and the rear seat back frame 5, and the upper guide bracket support member 32 and the lower guide bracket support member 34 and the rear seat back frame 5 can be welded. As shown in 'A' of FIG. 5, both surfaces of the upper guide bracket support member 32 and both surfaces of the lower guide bracket support member 34 are welded to the guide bracket 30 and the rear seat back frame 5, respectively.

Meanwhile, the pair of guide brackets 30 may be connected in the horizontal direction of the vehicle by the covering shelf support wire 36. The covering shelf support wire 36 is inserted into the slit of the guide bracket 30 in a state in which the first covering shelf 10 and the second covering shelf 20 are folded. Then, the covering shelf support wire 36 is configured to support the first covering shelf 10 and the second covering shelf 20 from the trunk compartment side toward the rear seat back frame 5 so that they do not fall from being rotated toward the trunk compartment.

As shown in FIG. 6 and FIG. 7, a support slot 16 may be provided at a side end portion of the first covering shelf 10, and the support slot 16 may be inserted into the support protrusion 9 protruding from the luggage side trim 7 forming the trunk compartment of the vehicle. The support slot 16 and the support protrusion 9 may be provided with the same plurality of each other. When the first covering shelf 10 is provided in the horizontal direction of the vehicle, the support slot 16 is inserted on the support protrusion 9 so that the first covering shelf 10 can be supported in the horizontal direction thereof.

Figure 8:
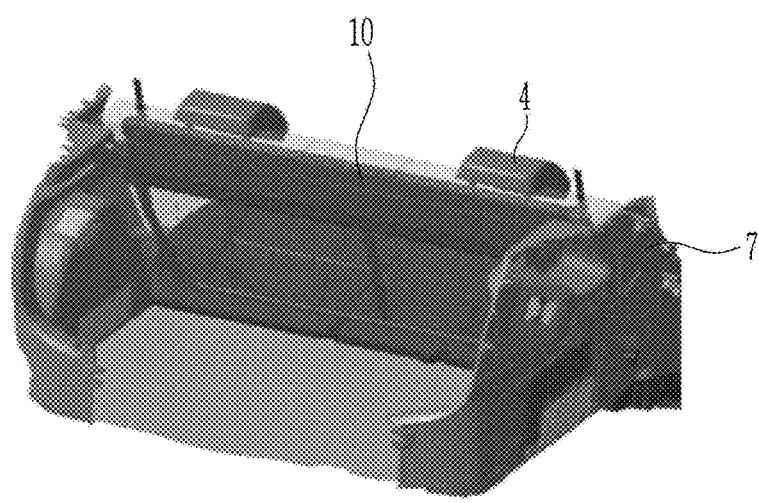
FIG. 8 is a view showing an undeployed state of the convertible covering shelf structure according to various exemplary embodiments of the present disclosure.
Figure 9:
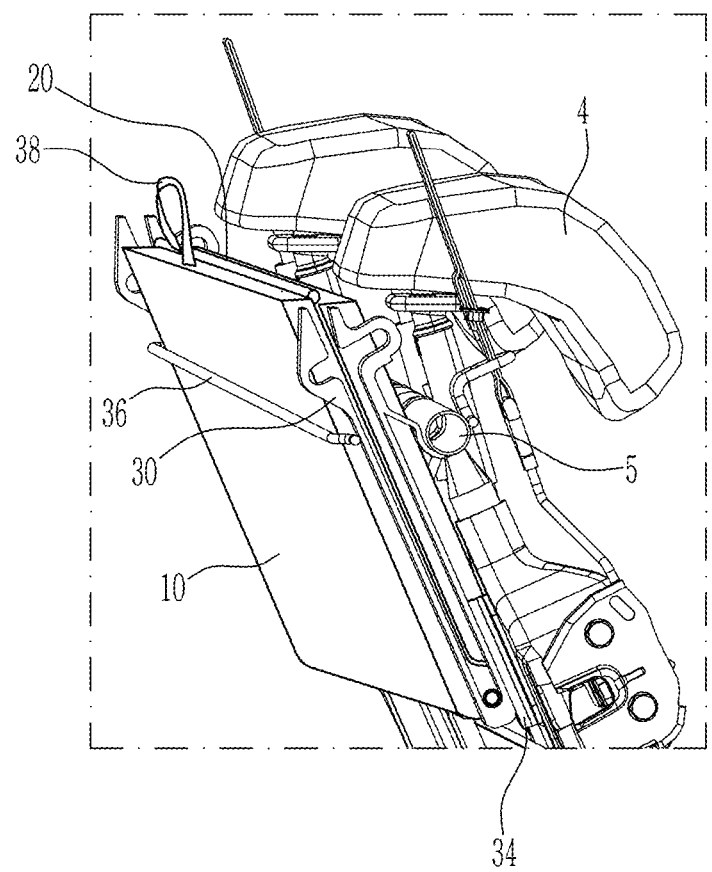
FIG. 9 is a view showing a state in which the guide hinge pin of the first covering shelf is positioned at the lowest point of a slit of the guide bracket in an undeployed state of the convertible covering shelf structure according to various exemplary embodiments of the present disclosure.

FIG. 8 is a view showing an undeployed state of the convertible covering shelf structure according to various exemplary embodiments of the present disclosure, and FIG. 9 is a view showing a state in which the guide hinge pin of the first covering shelf is positioned at the lowest point of a slit of the guide bracket in an undeployed state of the convertible covering shelf structure according to various exemplary embodiments of the present disclosure.

Referring to FIG. 8 and FIG. 9, in the undeployed state of the convertible covering shelf structure, the first covering shelf 10 and the second covering shelf 20 are in a folded state, and the guide hinge pins 12 on both sides of the other end portion of the first covering shelf 10 are positioned at the lowest point of the slit of the guide bracket 30. At the instant time, the first covering shelf 10 and the second covering shelf 20 are provided in the same direction as the longitudinal direction of the guide bracket 30, and the covering shelf support wire 36 supports the first covering shelf 10 and the second covering shelf 20 from the trunk compartment side toward the rear seat back frame 5.

A strap 38 may be provided at the central end portion of the first covering shelf 10 of a hinge portion 50 where the second covering shelf 20 and the first covering shelf 10 are folded. When the user grips the strap 38 and pulls it upward, the first covering shelf 10 and the second covering shelf 20 may move upwards of the guide bracket 30.

Figure 10:
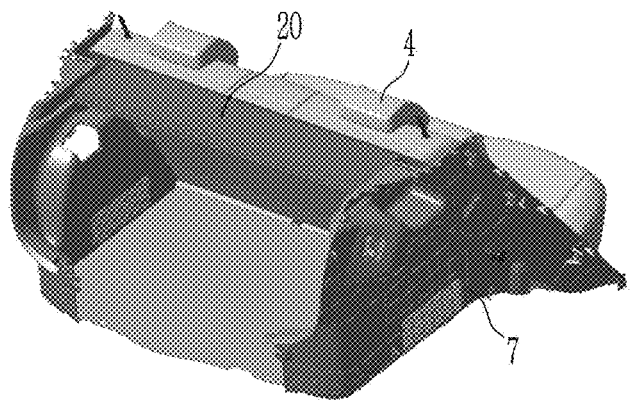
FIG. 10 is a view exemplarily illustrating a state in which the covering shelf is provided in a horizontal direction of the vehicle in a variable state of the convertible covering shelf structure according to various exemplary embodiments of the present disclosure.
Figure 11:
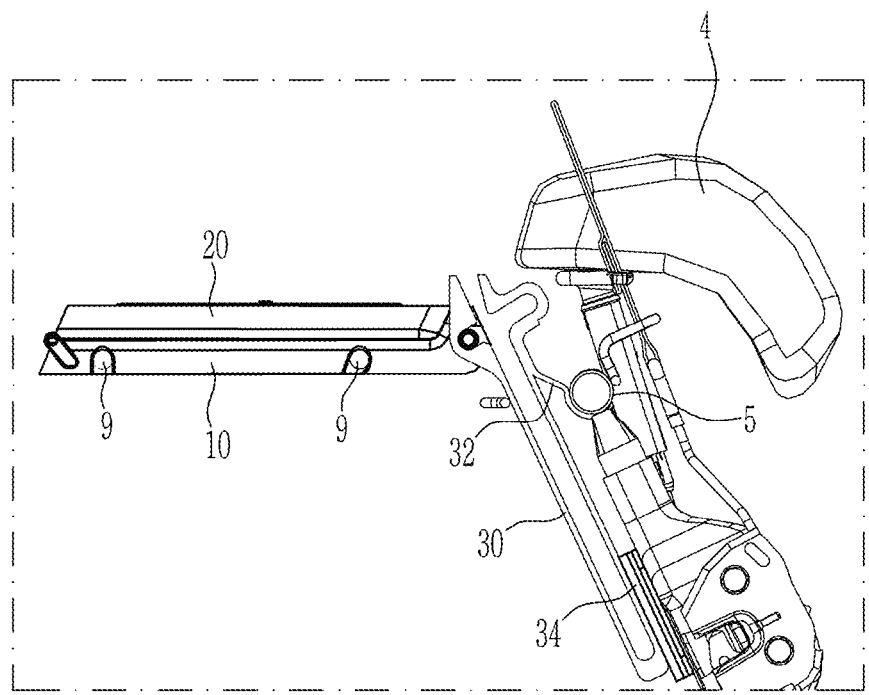
FIG. 11 is a view exemplarily illustrating a state in which a first covering shelf is supported on a support protrusion in a variable state of the convertible covering shelf structure according to various exemplary embodiments of the present disclosure.
Figure 12A:
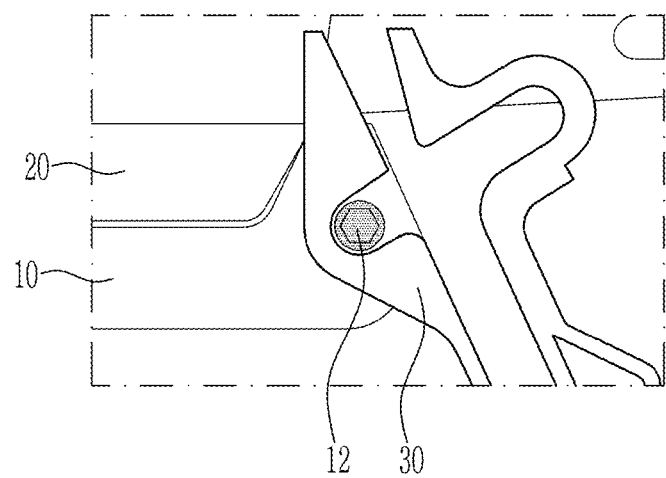
FIG. 12A and FIG. 12B are views showing a state in which the guide hinge pin is inserted into the upper slit of the guide bracket in the variable state of the convertible covering shelf structure according to various exemplary embodiments of the present disclosure.
Figure 12B:
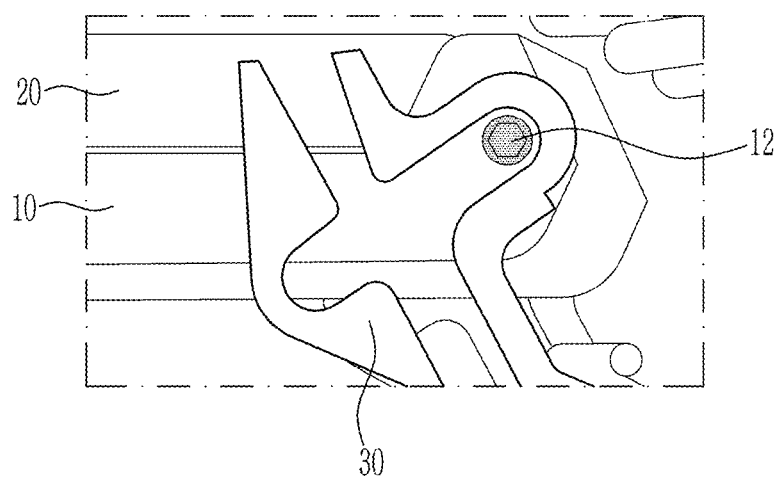

FIG. 10 is a view exemplarily illustrating a state in which the covering shelf is provided in a horizontal direction of the vehicle in a variable state of the convertible covering shelf structure according to various exemplary embodiments of the present disclosure, FIG. 11 is a view exemplarily illustrating a state in which a first covering shelf is supported on a support protrusion in a variable state of the convertible covering shelf structure according to various exemplary embodiments of the present disclosure, and FIG. 12A and FIG. 12B are views showing a state in which the guide hinge pin is inserted into the upper slit of the guide bracket in the variable state of the convertible covering shelf structure according to various exemplary embodiments of the present disclosure.

Referring to FIG. 10, FIG. 11, FIG. 12A and FIG. 12B, when the user grips the strap 38 and pulls it upward, the first covering shelf 10 and the second covering shelf 20 move upwards of the guide bracket 30. Then, when the user pulls the strap 38 toward the rear side of the vehicle, the first covering shelf 10 and the second covering shelf 20 rotate, and then the support slot 16 provided at the side end portion of the first covering shelf 10 is inserted into the support protrusion 9 protruded from the luggage side trim 7 so that the first covering shelf 10 and the second covering shelf 20 are supported and provided in the horizontal direction of the vehicle.

Furthermore, the guide hinge pins 12 provided on both sides of the other end portion of the first covering shelf 10 are moved from the upper slit of the guide bracket 30 toward the trunk compartment. Also, the other end portion of the first covering shelf 10 is supported by the slit on the upper side of the guide bracket 30.

The upper slit of the guide bracket 30 is formed toward the front and rear of the vehicle. Accordingly, by moving the guide hinge pin 12 to the upper slit of the guide bracket 30 formed toward the rear of the vehicle and then moving it toward the lower portion of the slit of the guide bracket 30, the first covering shelf 10 and the second covering shelf 20 may be provided again in the same direction as the extension direction of the guide bracket.

Figure 13:
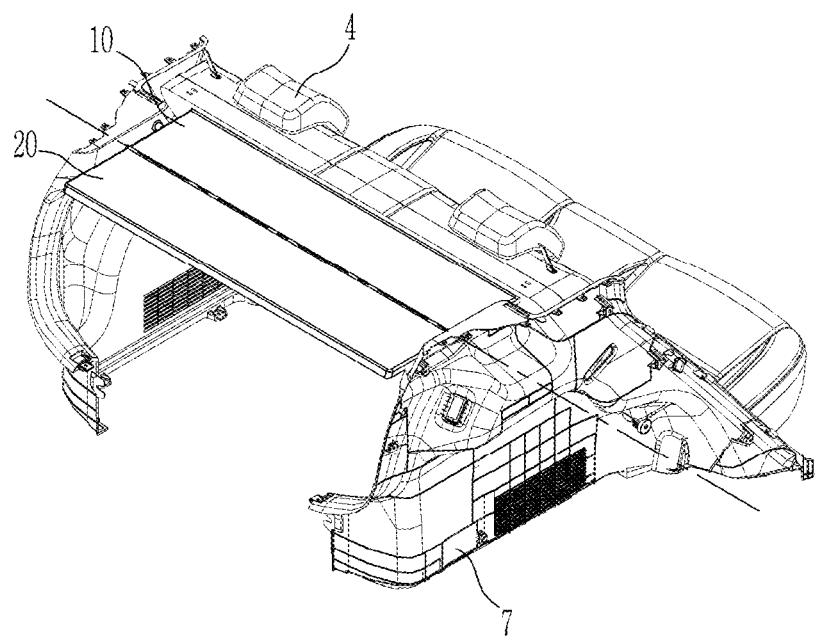
FIG. 13 is a view exemplarily illustrating a state in which a second covering shelf is deployed from a first covering shelf in a variable state of the convertible covering shelf structure according to various exemplary embodiments of the present disclosure.
Figure 14:
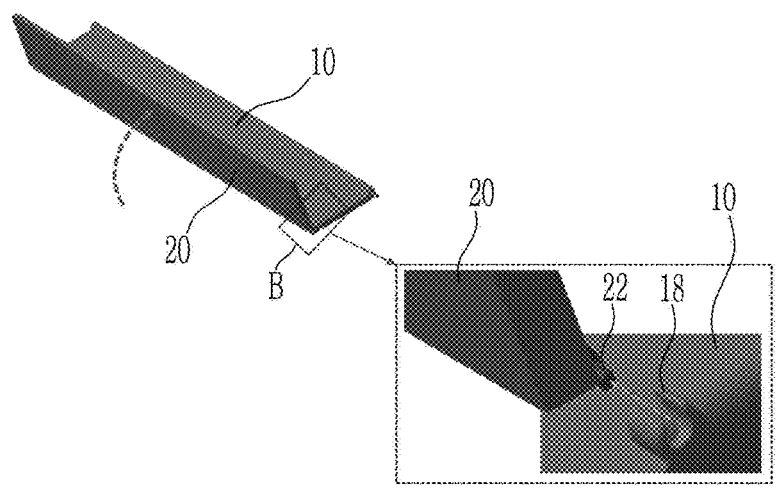
FIG. 14 is a view exemplarily illustrating an example of a state in which a first covering shelf and a second covering shelf of the convertible covering shelf structure according to various exemplary embodiments of the present disclosure are separated.
Figure 15:
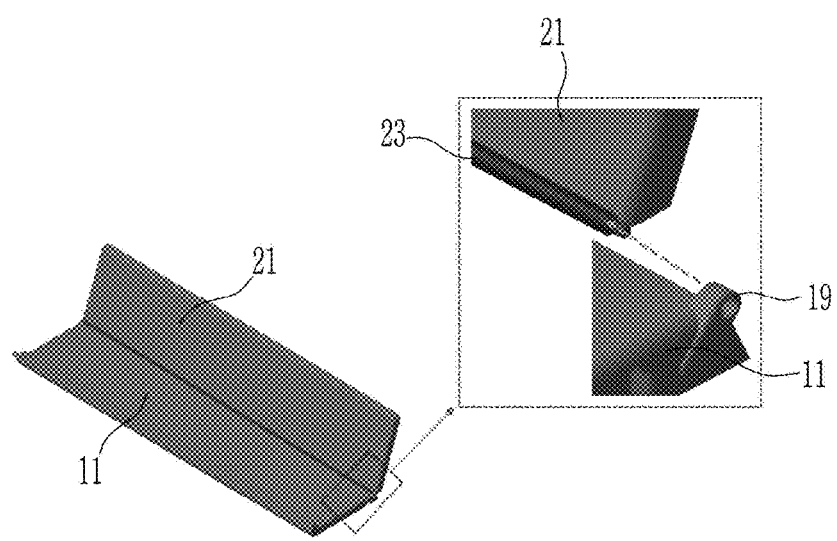
FIG. 15 is a view showing another example of a state in which the first covering shelf and the second covering shelf of the convertible covering shelf structure according to various exemplary embodiments of the present disclosure are separated.
Figure 16:
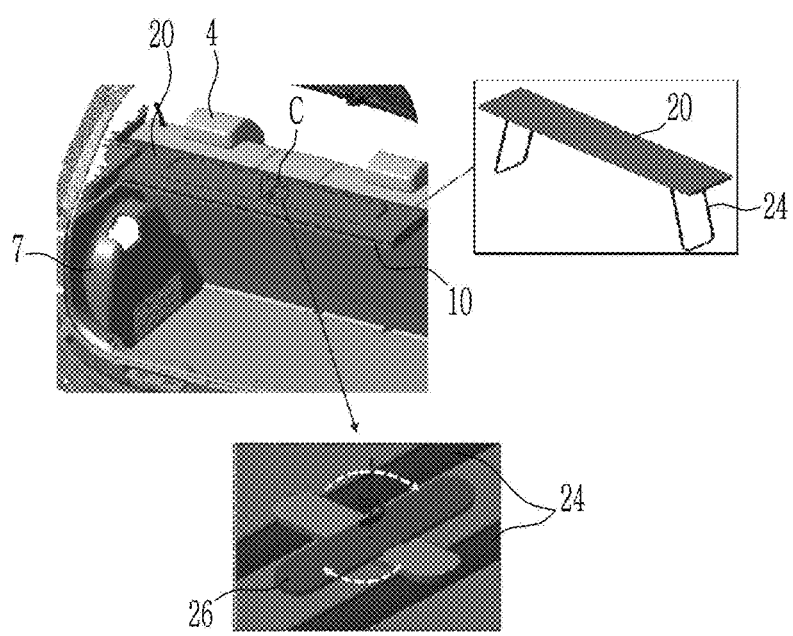
FIG. 16 is a diagram illustrating a state in which the second covering shelf of the convertible covering shelf structure according to various exemplary embodiments of the present disclosure is separated and used as a table.

FIG. 13 is a view exemplarily illustrating a state in which a second covering shelf is deployed from a first covering shelf in a variable state of the convertible covering shelf structure according to various exemplary embodiments of the present disclosure, FIG. 14 is a view exemplarily illustrating an example of a state in which a first covering shelf and a second covering shelf of the convertible covering shelf structure according to various exemplary embodiments of the present disclosure are separated, FIG. 15 is a view showing another example of a state in which the first covering shelf and the second covering shelf of the convertible covering shelf structure according to various exemplary embodiments of the present disclosure are separated, and FIG. 16 is a diagram illustrating a state in which the second covering shelf of the convertible covering shelf structure according to various exemplary embodiments of the present disclosure is separated and used as a table.

Referring to FIG. 13, after the first covering shelf 10 and the second covering shelf 20 are arranged in the horizontal direction of the vehicle, when the second covering shelf 20 is hingedly rotated, the first covering shelf 10 and the second covering shelf 20 is fully unfolded.

As shown in FIG. 14, both sides of the first covering shelf 10 of a hinge portion where the second covering shelf 20 and the first covering shelf 10 are folded may be provided with open openings 18 including one open side as shown in 'B' portion, and connection protrusions 22 may be provided on both sides of the second covering shelf 20 of the hinge portion. The connection protrusion 22 is inserted into the open opening so that the second covering shelf 20 can hinge with respect to the first covering shelf 10, and by allowing the connection protrusion 22 to disengage from the open portion of the open opening 18, the second covering shelf 20 can be separated from the first covering shelf 10.

Furthermore, as shown in FIG. 15, closed openings 19 may be formed on both sides of the first covering shelf 10 of the hinge portion, and the second covering shelf 20 of the hinge portion may be provided with a connection rod 23 detachable in the longitudinal direction thereof. The connection rod 23 is inserted into the closed opening so that the second covering shelf 20 can hinge with respect to the first covering shelf 10, and by allowing the connection rod 23 to disengage from the closed opening, the second covering shelf 20 may be separated from the first covering shelf 10.

As shown in FIG. 16, a pair of support pipes 24 may be provided on one surface of the second covering shelf 20. The support pipe 24 is provided on one surface of the second covering shelf 20 to be symmetrical to each other, one end portion of the support pipe 24 may be rotatably fixed to one surface of the second covering shelf 20, and the other end portion of the support pipe 24 may be rotated toward one surface of the second covering shelf 20.

As shown in the 'C' portion of FIG. 16, a locking plate 26 rotating on one surface of the second covering shelf 20 may be provided at a center portion of one surface of the second covering shelf 20, and the locking plate 26 may operate to attach or release the other end portion of the pair of support pipes 24 to one surface of the second covering shelf 20 by rotation thereof.

After the second covering shelf 20 is separated from the first covering shelf 10, the lock plate 26 is rotated to detach the support pipe 24 from the second covering shelf 20, then, the second covering shelf 20 and the support pipe 24 may be used for purposes such as, for example, a picnic table. On the other hand, the non-separated first covering shelf 10 may be used as a separate item holder in a state in which the first covering shelf 10 is provided in the horizontal direction of the vehicle.

Figure 17:
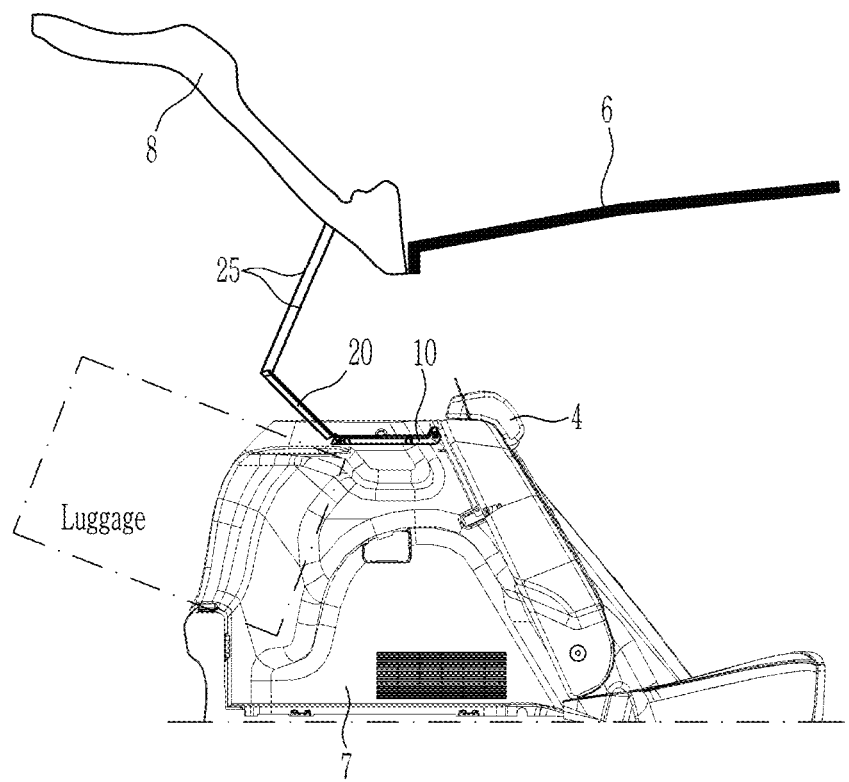
FIG. 17 is a diagram illustrating a state in which the tailgate of the convertible covering shelf structure according to various exemplary embodiments of the present disclosure is developed in conjunction with the tail gate.
Figure 18:
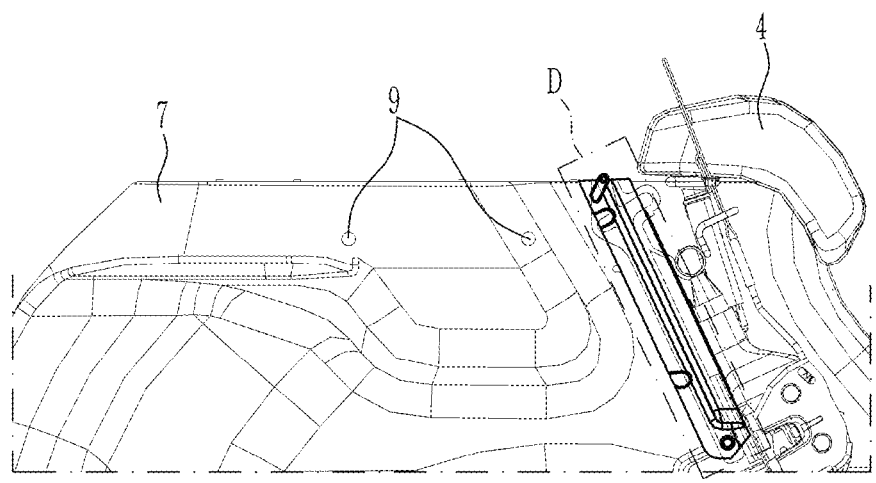
FIG. 18, FIG. 19, FIG. 20, FIG. 21, FIG. 22 and FIG. 23 are views exemplarily illustrating a modification sequence of the convertible covering shelf structure according to various exemplary embodiments of the present disclosure.

FIG. 17 is a diagram illustrating a state in which the tailgate of the convertible covering shelf structure according to various exemplary embodiments of the present disclosure is developed in conjunction with the tail gate.

As shown in FIG. 17, one central end portion of the second covering shelf 20 may be connected to a tailgate 8 of the vehicle by a cable 25, and when the tailgate 8 is opened, the cable 25 pulls one end portion of the second covering shelf 20 so that the second covering shelf 20 hinges upward with respect to the first covering shelf 10. Accordingly, when the tailgate 8 is opened, a space in the trunk compartment may be secured by the hinge rotation of the second covering shelf 20 toward the upper side, and the user can easily load the luggage into the trunk compartment. When the tailgate 8 is closed, the second covering shelf 20 is in an unfolded state to form the same plane as the first covering shelf 10, so that the first covering shelf 10 and the second covering shelf 20 can be an item holder.

FIG. 18, FIG. 19, FIG. 20, FIG. 21, FIG. 22 and FIG. 23 are views exemplarily illustrating a modification sequence of the convertible covering shelf structure according to various exemplary embodiments of the present disclosure.

Figure 19:
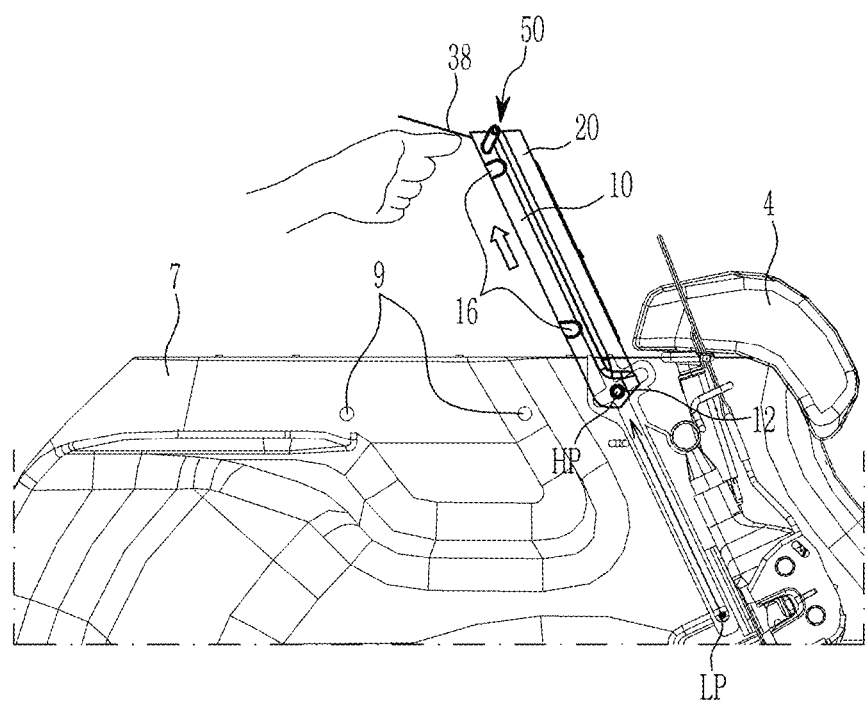

In a state in which the first covering shelf 10 and the second covering shelf 20 are folded and provided in the same direction as the guide bracket 30 (FIG. 18, 'D' portion), the user grips the strap 38 provided at the central end portion of the first covering shelf 20 at the hinge portion where the second covering shelf 20 and the first covering shelf 10 are folded to form the upper portion of the guide bracket 30 and pulls the strap 38 toward the top portion of the guide bracket 30. Then, the first covering shelf 10 and the second covering shelf 20 are moved upwards of the guide bracket 30 (FIG. 19).

Figure 20:
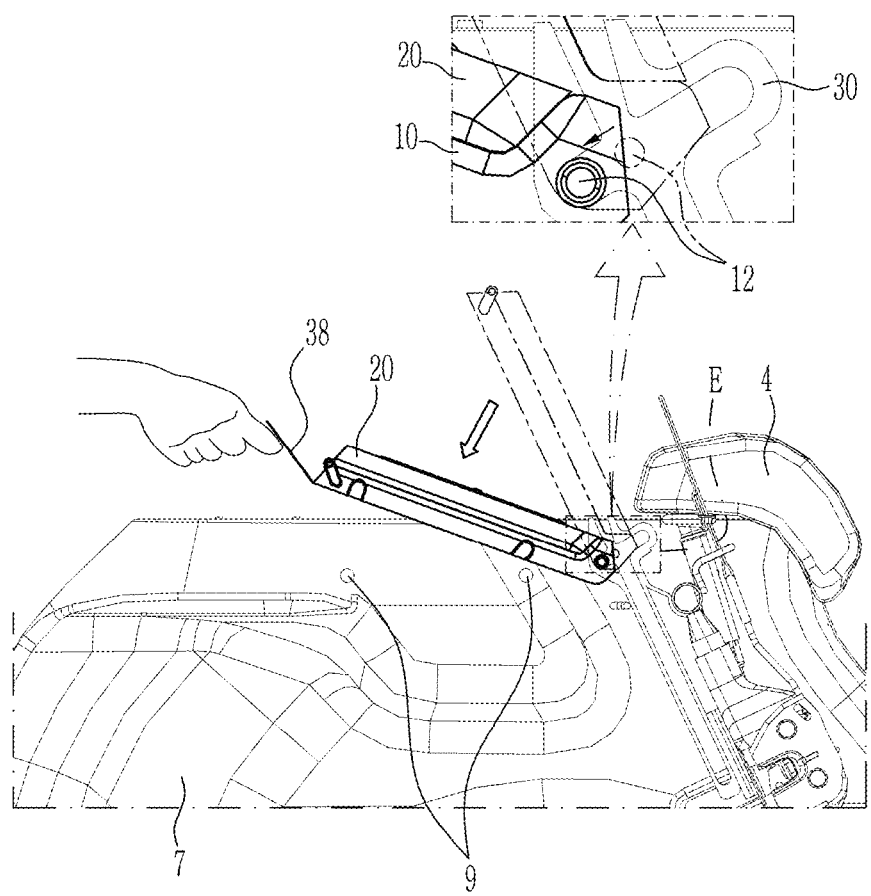

In the present state, when the user rotates the first covering shelf 10 and the second covering shelf 20 by pulling the strap 38 toward the rear side of the vehicle, the guide hinge pins 12 provided on both sides of the other end portion of the first covering shelf 10 are moved from the upper slit of the guide bracket 30 toward the trunk compartment (FIG. 20, 'E' portion).

Figure 21:
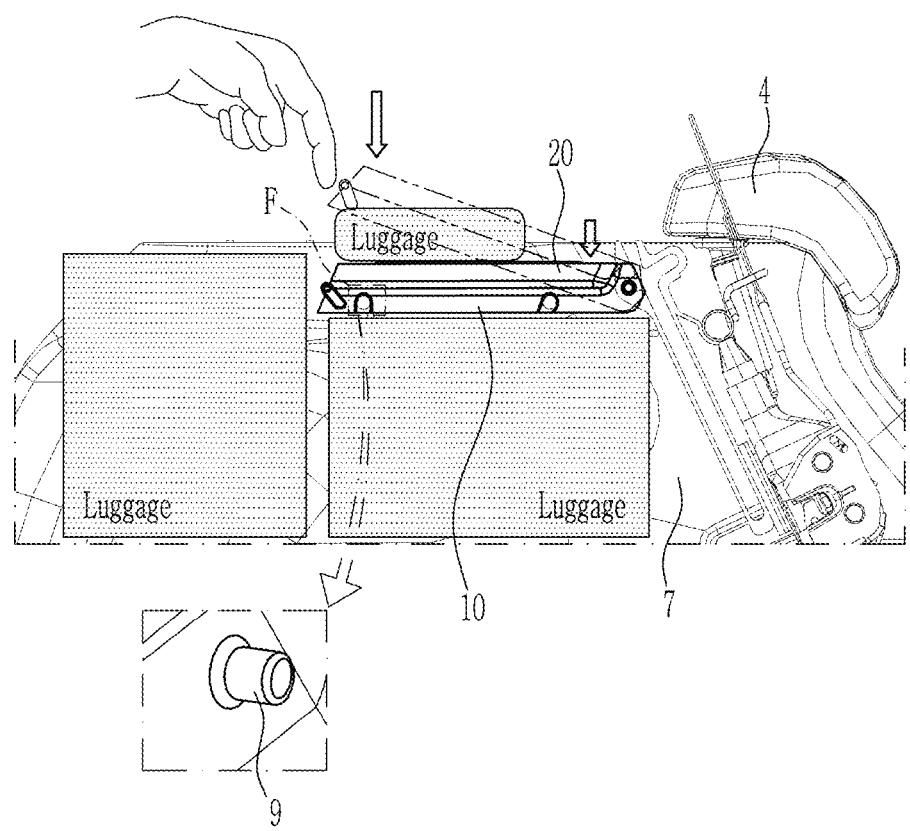
Figure 22:
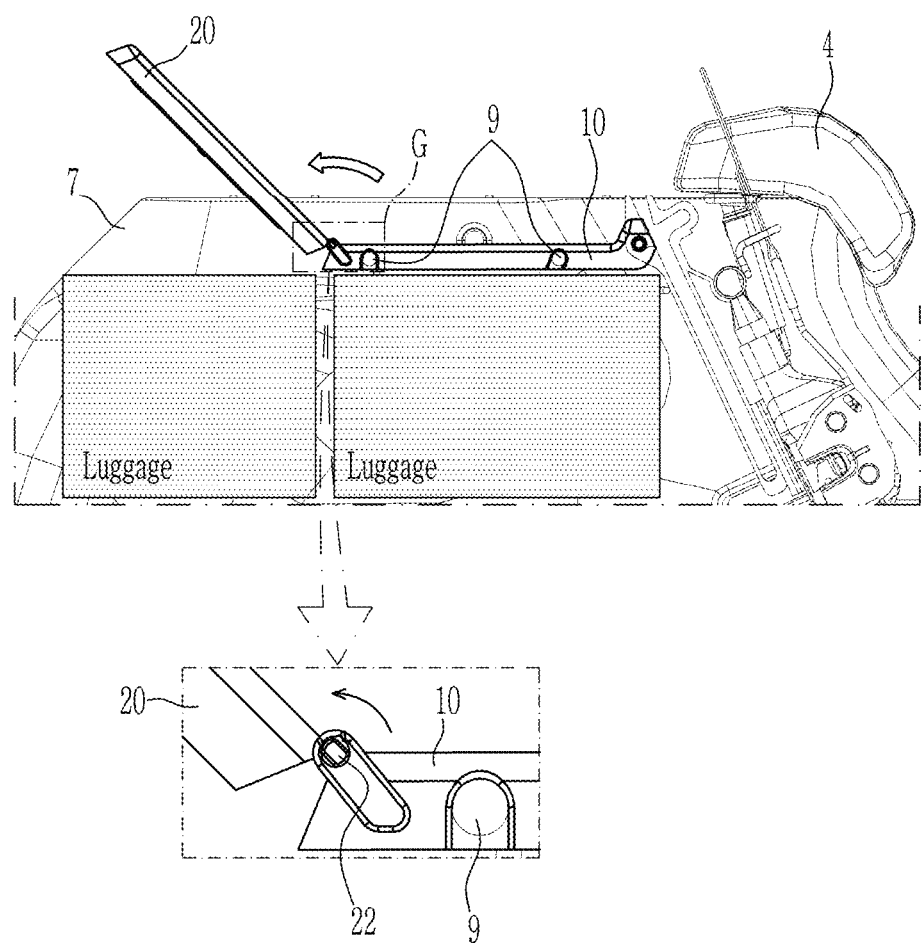

Then, when the user presses down the upper surface of the second covering shelf as shown in 'F' portion, the support slot 16 provided at the side end portion of the first covering shelf 10 is inserted into the support protrusion 9 protruded from the luggage side trim 7, and the first covering shelf 10 and the second covering shelf 20 are supported and provided in the horizontal direction of the vehicle (FIG. 21).

Figure 23:
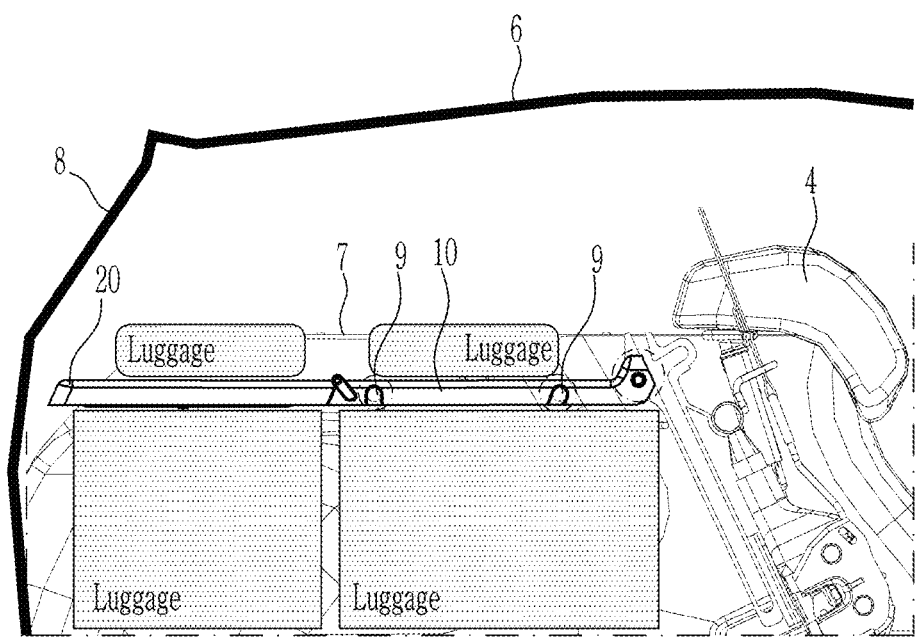

Then, when the second covering shelf 20 is hinged with respect to the first covering shelf 10 (FIG. 22, G' portion), a state in which the first covering shelf 10 and the second covering shelf 20 form the same plane, that is, a state in which they are fully deployed (FIG. 23). At the instant time, the end portions of the first covering shelf 10 and the second covering shelf 20 in the hinge region are in contact with each other, so that the second covering shelf 20 is not rotated further downward by the first covering shelf 10 become supported. In the instant state, the luggage may be mounted on the first covering shelf 10 and the second covering shelf 20. Furthermore, luggage may be stored in the trunk compartment under the first covering shelf 10 and the second covering shelf 20.

Like this, according to various exemplary embodiments of the present disclosure, by adopting a double convertible covering shelf structure which is provided on the rear seat back frame of the vehicle and is rotatable and detachable, it is possible to increase the luggage storage space in the trunk.

Furthermore, by allowing the covering shelf to rotate according to the opening and closing of the tailgate, a user can easily change the covering shelf, improving usability.

Furthermore, the covering shelf separated by the detachable double covering shelf structure may be used as a table, and the non-separable covering shelf may be used as a separate item holder.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A convertible covering shelf structure for dividing a rear portion of a rear seat and a cargo space of a trunk compartment in a vehicle, the convertible covering shelf structure comprising,
   a first covering shelf provided behind the rear seat;
   a second covering shelf which is hingedly connected to a first end portion of the first covering shelf and is selectively foldable to the first covering shelf or deployable from the first covering shelf; and
   a pair of guide brackets fixed to a rear seat back frame of the vehicle and including a slit into which first and second sides of a second end portion of the first covering shelf are coupled for the first covering shelf to move along the slit,
   wherein the pair of guide brackets is horizontally connected to the vehicle by a covering shelf support wire, and
   wherein the covering shelf support wire supports the first covering shelf and the second covering shelf from a trunk compartment side after the first covering shelf and the second covering shelf are coupled to the slit of the guide brackets.

2. The convertible covering shelf structure of claim 1, wherein, when the second covering shelf is horizontally folded to the first covering shelf, an upper surface of the second covering shelf is positioned to face an upper surface of the first covering shelf.

3. The convertible covering shelf structure of claim 1, wherein guide hinge pins are provided on the first and second sides of the second end portion of the first covering shelf, and
   wherein the guide hinge pins are inserted into the slit of the guide brackets for the first covering shelf to move in a longitudinal direction of the guide brackets.

4. The convertible covering shelf structure of claim 3, wherein the guide hinge pins are inserted into a hollow of guide hinge bushes, and
   wherein the guide hinge bushes are inserted into the slit of the guide brackets.

5. The convertible covering shelf structure of claim 1, wherein the guide brackets include an upper slit connected to the slit to extend in front and rear direction of the vehicle.

6. The convertible covering shelf structure of claim 1, wherein an upper guide bracket support member is provided on an upper side of the guide brackets, and a lower guide bracket support member is provided on a lower side of the guide brackets, and wherein the upper guide bracket support member and the lower guide bracket support member are attached to the rear seat back frame.

7. The convertible covering shelf structure of claim 1, wherein a support slot is provided at a side end portion of the first covering shelf, and
wherein the support slot is inserted into a support protrusion protruding from a luggage side trim forming a trunk compartment of the vehicle when the first covering shelf is deployed, so that the first covering shelf is supported on the support protrusion.

8. The convertible covering shelf structure of claim 1, wherein a central end portion of the second covering shelf is connected to a tailgate of the vehicle by a cable, and
wherein when the tailgate is open, the second covering shelf operates to hinge with respect to the first covering shelf by pulling an end portion of the second covering shelf through the cable.

9. The convertible covering shelf structure of claim 1, wherein a user grippable strap is provided at a central end portion of the first covering shelf at a hinge portion where the second covering shelf and the first covering shelf are folded.

10. The convertible covering shelf structure of claim 9, wherein open openings including one open side are provided on first and second sides of the first covering shelf of the hinge portion, and
wherein connection protrusions are provided on first and second sides of the second covering shelf of the hinge portion, and
wherein the connection protrusions are inserted into the open openings so that the second covering shelf hinges with respect to the first covering shelf and the connection protrusions are selectively separatable from the open side of the open openings.

11. The convertible covering shelf structure of claim 9, wherein closed openings are provided on first and second sides of the first covering shelf of the hinge portion,
wherein a connection rod detachable in a longitudinal direction thereof is provided on the second covering shelf of the hinge portion, and
wherein a first end and a second end of the connection rod are inserted into the closed openings so that the second covering shelf hinges with respect to the first covering shelf and the connection rod is selectively separatable from the closed openings.

12. The convertible covering shelf structure of claim 1, wherein a pair of support pipes including a first end portion rotatably fixed to the second covering shelf is provided on a surface of the second covering shelf, and
wherein a second end portion of the pair of support pipes is rotated toward the surface of the second covering shelf.

13. The convertible covering shelf structure of claim 12, wherein a locking plate rotating on the surface of the second covering shelf is provided at a center portion of the surface of the second covering shelf, and
wherein the locking plate operates to attach or release the second end portion of the pair of support pipes to the surface of the second covering shelf by rotation thereof.

* * * * *